United States Patent [19]
Byrnes, Sr.

[11] 3,707,925
[45] Jan. 2, 1973

[54] REVERSIBLE INCLINED CONVEYOR FOR MEAT CARRYING TROLLEYS

[76] Inventor: Robert M. Byrnes, Sr., Box 1121 Ames Avenue Station, Omaha, Nebr. 68111

[22] Filed: May 4, 1971

[21] Appl. No.: 140,112

[52] U.S. Cl. .................... 104/167, 104/93, 198/213
[51] Int. Cl. ......................... B61b 13/12, B65g 33/04
[58] Field of Search ..... 104/165, 166, 167, 172 S, 89, 104/91, 93, 110; 198/213

[56] References Cited

UNITED STATES PATENTS

| | | | |
|---|---|---|---|
| 3,472,177 | 10/1969 | Di Rosa | 104/172.5 |
| 2,404,885 | 7/1946 | Pile | 198/177 |
| 2,987,170 | 6/1961 | Hamilton | 198/213 |
| 2,383,835 | 8/1945 | Ackermann | 17/1 |
| 2,593,699 | 4/1952 | Rose | 104/91 |

FOREIGN PATENTS OR APPLICATIONS

| | | | |
|---|---|---|---|
| 266,130 | 10/1913 | Germany | 104/167 |
| 621,016 | 5/1961 | Canada | 104/93 |

*Primary Examiner*—Gerald M. Forlenza
*Assistant Examiner*—Robert Saifer
*Attorney*—Clarence A. O'Brien and Harvey B. Jacobson

[57] ABSTRACT

An inclined screw conveyor assembly for moving meat trolleys is provided which includes an elongated screw shaft rotatably mounted within a support frame having an inclined trolley rail attached thereto for support of the trolley wheel of a meat carrying trolley, a shaft support bearing at each end of the screw shaft, an adjustable intermediate sleeve bearing which engages the outermost surfaces of the screw shaft to prevent flexing or buckling thereof, and a side guide rail extending along the length of the support frame for maintaining the trolley in proper alignment with the trolley rail. Each end of the screw shaft extends beyond the ends of the inclined trolley rail to deliver and receive the meat trolleys to and from relatively horizontal upper and lower sections of trolley rail.

11 Claims, 7 Drawing Figures

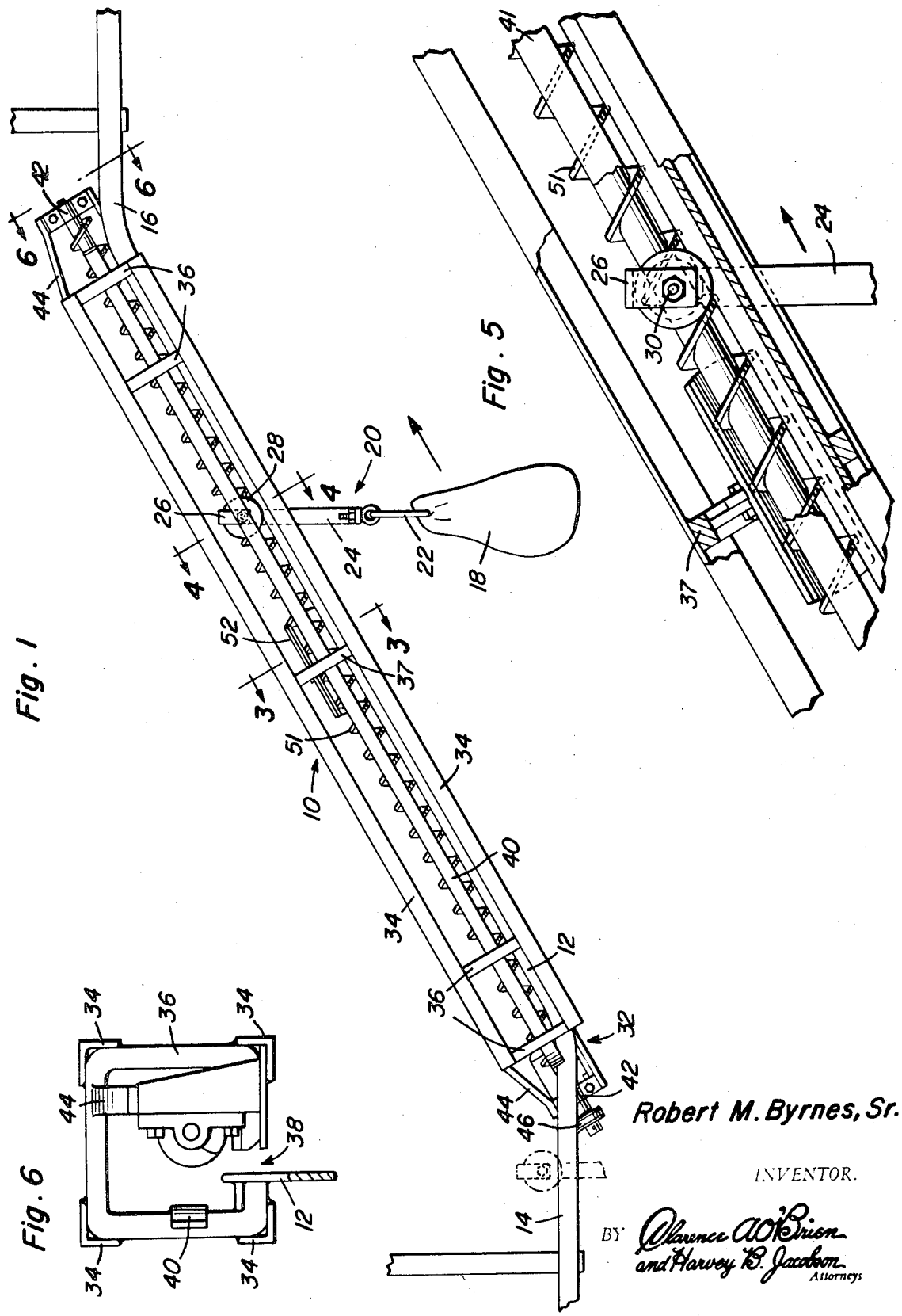

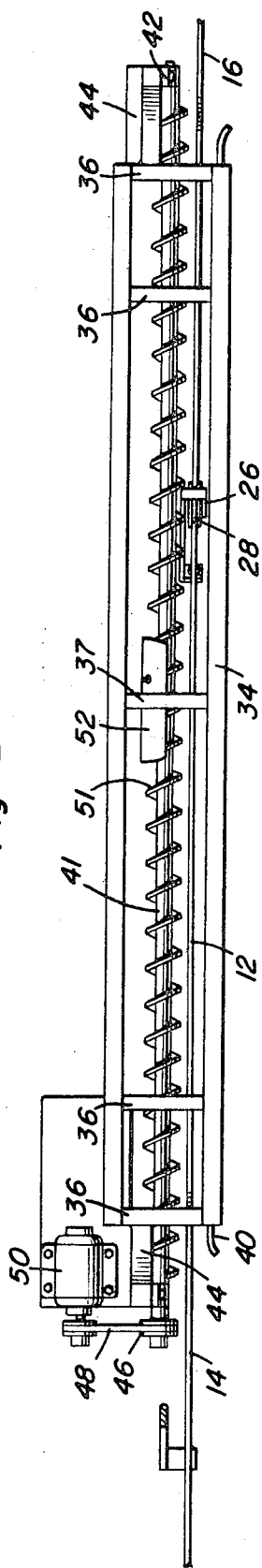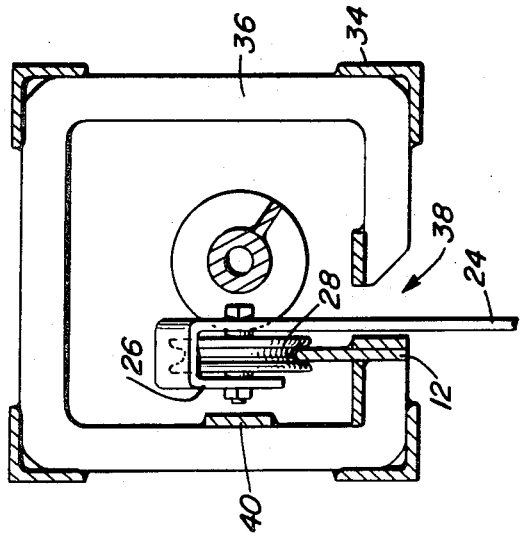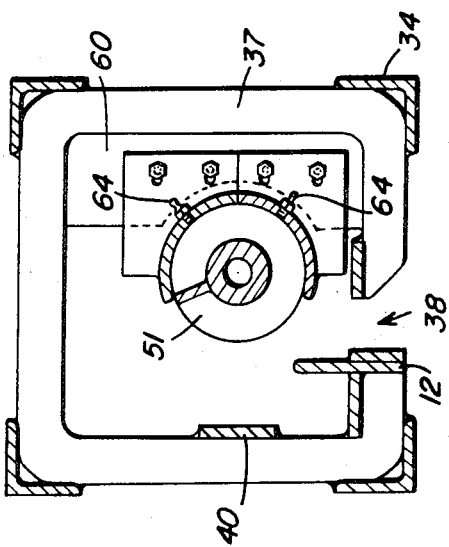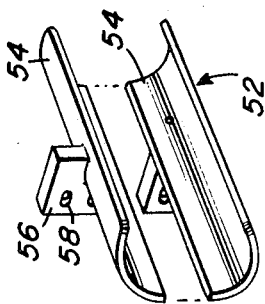

REVERSIBLE INCLINED CONVEYOR FOR MEAT CARRYING TROLLEYS

The present invention generally relates to moving conveyors, and more particularly to conveyors for use in meat packing houses where the carcasses of beef and the like must be moved from one location to another. In the past, the movement of such meat carcasses was accomplished by suspended chain-type conveyors which advanced the meat from one location to the next. Such, however, has been found to be very costly to install and maintain.

The use of gravity-type trolley conveyors was also common in meat packing and processing houses, whereby a meat trolley was moved from one place to another on a tilted trolley rail. While such an arrangement was relatively inexpensive, it was necessary to periodically lift, or raise, the meat to a higher level to make up for the gradual vertical drop along each section of tilted trolley rail. Such lifting was either done manually or by sophisticated machinery which removed each carcass and its trolley from one section of rail and transferred it to an elevated section of rail. The lifting procedure often resulted in accidents due to the fact that the heavy carcasses of beef or the like would break loose or jump from the conveyor rail and injure attendants working nearby.

With the tremendous increase in labor costs in the recent years and the need for increased efficiency and with minimum maintenance costs for machinery, such methods of lifting have been found to be unfeasible and entail prohibitive costs.

It is an object of the present invention to provide a versatile, relatively simple inclined screw conveyor for meat carrying trolleys which is automatic in nature, yet inexpensive to install, operate and maintain.

Another object of the present invention is to provide a screw-type conveyor which automatically transfers meat trolleys from one level of a gravity feed trolley rail to another at a predetermined speed and without requiring an operator or attendant to watch over it.

It is a further object of the present invention to provide a unique inclined screw conveyor for meat trolleys comprising a motor driven screw shaft mounted along an inclined section of trolley rail, the screw shaft being mounted in a pair of end bearings, and supported by an intermediate sleeve-type bearing which engages the outermost screw surfaces to ensure against shaft flexing and thereby assuring positive engagement between the conveyor screw and the meat trolleys for movement thereof.

Still another object of the present invention is to provide a conveyor system having a gravity feed type trolley rail with several relatively horizontal, but slightly tilted, sections which are joined by and continuous with intermediate inclined sections, each extending through a closely mounted screw conveyor section for raising and lowering meat trolleys from one section of trolley rail to another.

It is another object of the present invention to provide a versatile system for moving relatively heavy meat carcasses through a meat packing house or slaughterhouse, such that each carcass is held under control while moving up or down an inclined section of trolley rail.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is an elevated side view of the inclined screw conveyor and trolley rail assembly of the present invention;

FIG. 2 is a plan view of the screw conveyor assembly shown in FIG. 1;

FIG. 3 is an enlarged cross-sectional view of the screw conveyor assembly taken along section 3—3 of FIG. 1;

FIG. 4 is an enlarged cross-sectional view of the screw conveyor assembly taken along section 4—4 of FIG. 1;

FIG. 5 is a partial enlarged elevated view of the conveyor assembly shown in FIG. 1, with sections removed;

FIG. 6 is an enlarged end view of the conveyor assembly taken along section 6—6, as shown in FIG. 1; and FIG. 7 is an enlarged exploded perspective view of the sleeve-type bearing assembly which supports the center portion of the screw conveyor shaft.

Referring, now, more specifically to FIG. 1, the inclined screw conveyor assembly of the present invention is generally indicated by the numeral 10, and includes an inclined trolley rail section 12 which is joined to and continuous with lower trolley rail section 14, at its lower end, and upper trolley rail section 16 at its upper end. The upper and lower trolley rail sections may be of the conventional gravity feed type, such that they are tilted slightly from the horizontal to provide movement of the trolley assemblies mounted thereon. Screw conveyor assembly 10 is intended for use in meat packing or processing houses to provide for the movement of meat carcasses 18, each of which is mounted to a trolley assembly, generally indicated by the numeral 20. Each trolley assembly includes a meat hook or fastener 22 which is connected to a shackle member 24, such that it hangs downwardly therefrom. The top of each shackle 24 may include an overlapping portion 26 which straddles a grooved trolley wheel 28 which may be pivotally mounted thereto by way of a nut-and-bolt assembly 30 for free rotation thereof.

In the conveyor system of the present invention each trolley assembly advances slowly along the tilted trolley rail sections until it arrives at the low point, or end of the section, where it engages the lower end 32 of the inclined screw conveyor assembly. The screw conveyor assembly advances each trolley assembly up the inclined section of trolley rail to the top thereof, where it is placed on upper trolley rail section 16 for further advance under the forces of gravity.

The screw conveyor assembly includes an elongated framework comprised of four angle irons 34 which are interconnected by way of a plurality of square or rectangular-shaped supports 36 and 37 spaced along the length of angle irons 34 and, preferably, welded thereto. Each rectangular-shaped support 36 and 37 has an opening 38 therein, as shown in FIG. 4, to accommodate the movement of shackles 24 therethrough. Each support 36 is welded, or otherwise fastened, to inclined trolley rail section 12 to ensure rigid relation therewith. An elongated side guide rail 40 is welded to the interior surface of support 36 to assure against misalignment of derailment of the trolley assemblies 20 as they move along the inclined trolley rail section. A pair of end bearings 42 are fastened to and supported by bearing support members 44 which are welded to the endmost supports 36, each bearing support extending outwardly from the elongated framework. The end portions of screw conveyor shaft 41 are journaled in the respective end bearings 42 for rotation therein, the lower shaft end extending beyond the end bearing and having a drive pulley 46 fixedly attached thereto for rotation by way of belt 48 which is advanced by a motor, such as electric motor 50, shown in FIG. 2. Preferably, motor 50 is of the reversible type, and has provisions for controlling the output speed thereof.

Screw conveyor shaft 41 has screw portions 51 extending outwardly therefrom for engagement with each trolley assembly, as hereinafter explained. The center portion of the screw conveyor shaft is supported by a split sleeve bearing assembly 52, the details of which are shown in FIG. 7. The split sleeve assembly is comprised of a pair of quarter cylindrical sleeves 54, each of which engages the outermost surfaces of screw portions 51. Each sleeve portion 54 is welded to a mounting plate 56 containing oval-shaped mounting apertures 58 which are adjustably fastened to a mounting bracket 60, which is welded to rectangular support 37 and extending between the horizontal sections of the support. The oval-shaped mounting apertures 58 permit sliding adjustment of sleeve portions 54 in a radial direction relative to screw conveyor shaft 41, such that proper engagement between screw portions 51 and the sleeve portions 54 is provided to assure against flexing of the conveyor shaft during operation. Thus, the screw conveyor shaft is held against flexing in a direction away from inclined trolley rail section 12, during movement of the trolley assemblies thereon. It should be noted, that each sleeve portion 54 may be provided with a conventional grease fitting 64, for proper lubrication of each of the engaging surfaces.

It is appreciated that as each trolley assembly 20 approaches the lower end 32 of the screw conveyor assembly it is engaged by a screw portion 51 which is continuously rotated by the motor 50 through the belt-and-pulley assembly, such that it is advanced up inclined trolley rail section 12, as shown in FIG. 5. In the preferred embodiment, the edges of screw portion 51 engage a portion of shackle member 24 for movement thereof, with grooved trolley wheel 28 maintaining engagement with rail section 12. It is apparent, that due to the forces exerted on shackle member 24, screw portions 51 tend to push the trolley assembly in the outward direction. Movement in this direction, however, is prevented by grooved drive wheel 28, and is further assured against by guide rails 40 which engage nut-and-bolt assemblies 30, should they be pushed to that extent under extreme load conditions. Furthermore, the flexing of screw conveyor shaft 41 is assured against by the split sleeve bearing assembly which is mounted diametrically opposite the contact points between screw surfaces 51 and shackle member 24. This is best illustrated in FIGS. 3 and 4.

It should be noted, that when desirable, a drive plate, or similar member may be welded to shackle member 24 to assure against wear caused by screw portions 51. Such an arrangement, however, has been found to be unnecessary if the proper pitch flighting is provided for the corresponding degree angle of inclination. For example, a 3 inch pitch flighting, or axial distance between screw portions, may be used for inclination angles of up to 17°, without noticeable wear on shackle member 24. Similarly, a 5 inch pitch flighting may be used for angles up to 23°, and a 6 inch pitch flighting for up to a 27° angle, and so on, such that the pitch flighting is increased along with the angle of inclination.

As each trolley assembly advances up the inclined trolley rail section, it is automatically delivered to the upper trolley rail section by way of the upper screw portions which extend to a sufficient height to assure that each trolley assembly is moved beyond the inclined rail section. Upon delivery to the upper trolley rail section, each trolley assembly will automatically advance under the forces of gravity due to the slight tilt of the trolley rail in this section, thus assuring space for each following trolley assembly. It should be noted, that while the screw conveyor assembly of the present invention is most often used for raising the meat carcasses to a higher level, they may also be used for lowering, when such is found to be necessary. For example, where the meat packing house contains more than a single floor or level, it may be necessary to advance the meat carcasses to a lower level. If this were done by gravity, the steep inclination of the inclined section of trolley rail might accelerate each trolley assembly to an unsafe speed, possible resulting in an accident or injury to the attendants nearby. Lowering the carcasses by way of the present invention, however, maintains safe control over them and assures against their breaking lose to cause possible injury. It is also appreciated, that the screw conveyor assembly is relatively simple in overall construction, economical to produce, yet durable, and requires a minimum amount of maintenance. Of course, minor changes in the shapes of the support framework, trolley assemblies or location and number of support bearings are deemed to fall within the scope of the present invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A screw conveyor assembly for moving suspended loads from one level to another, said assembly comprising an elongated inclined section of trolley rail extending between a lower level of trolley rail and an upper level of trolley rail, an elongated support framework adjacent to said inclined section of trolley rail, a relatively rigid screw conveyor shaft supported by said framework and having an axis of rotation substantially parallel to and laterally spaced from the longitudinal axis of said section of inclined trolley rail, openings in said framework adjacent said trolley rail for allowing passage of trolley assemblies carrying the suspended loads, said screw conveyor shaft being rotatably supported by a pair of end bearings, a sleeve bearing intermediate said end bearings for preventing the shaft from flexing relative to said inclined section of trolley rail, said end and sleeve bearings being carried by said support framework, said support framework at least partially surrounding said screw conveyor shaft such that said screw conveyor shaft extends longitudinally therethrough, said screw conveyor shaft including a continuous, relatively rigid helical screw portion extending radially outward and adapted to advance the leads along said inclined section of trolley rail, said sleeve bearing being comprised of at least one partial cylindrical sleeve coaxial with said shaft and slidably engaging the outermost edge surfaces of said screw, said support framework including an elongated side guide rail spaced from and substantially parallel to said screw conveyor shaft and being mounted on the diametrically opposite side of said screw conveyor shaft as said sleeve bearing, said section of inclined trolley rail lying in a vertical plane which passes between said screw conveyor shaft and said guide rail.

2. The structure set forth in claim 1 wherein said assembly includes a mounting supporting said sleeve bearing and adjustably fastened to said support framework for selective horizontal adjustment of said sleeve bearing relative to said section of inclined trolley rail.

3. The structure set forth in claim 2 wherein said mounting includes a pair of plates, said sleeve bearing includes a pair of adjacent partial cylindrical sections attached to said plates, each section slidably engaging said edge surfaces of several convolutions of said screw portion to prevent flexing of said screw conveyor shaft relative to said section of inclined trolley rail.

4. The structure set forth in claim 3 wherein said pair of sleeve bearing sections together extend circumferentially around said conveyor shaft screw portion on one horizontal side thereof.

5. The combination set forth in claim 1 together with at least one trolley assembly for suspending a load therefrom and having a trolley wheel engaging said inclined section of trolley rail for movement thereon.

6. The structure set forth in claim 5 wherein said trolley assembly includes an upper shackle portion engaged by surfaces of said screw portion for movement of the trolley assembly as said screw conveyor shaft is rotated.

7. The structure set forth in claim 6 wherein said upper shackle portion is disposed between said screw conveyor shaft and said guide rail, such as to assure against derailment of a trolley assembly from said trolley rail.

8. The structure set forth in claim 1 wherein said support framework includes at least one rigid rectangular-shaped support member having a pair of side members oppositely disposed of each other and on opposite sides of said screw conveyor shaft, said side guide rail attached to the interior of one of said side members, and a support bracket connected to said sleeve bearing and being attached to the other of said side members, thus providing rigidity between said screw conveyor shaft, side guide rail and inclined section of trolley rail.

9. A screw conveyor assembly for moving suspended loads from one level to another, said assembly comprising an elongated inclined section of trolley rail extending between a lower level of trolley rail and an upper level of trolley rail, a relatively rigid screw conveyor shaft substantially parallel to and laterally spaced to one side of said section of inclined trolley rail, bearing means rotatably supporting said screw conveyor shaft and maintaining it in said laterally spaced, parallel relation to said inclined section of trolley rail, at least one trolley assembly supported by said trolley rail for movement thereon, said screw conveyor shaft including a continuous, relatively rigid helical screw portion extending radially outward and adapted to advance the trolley assembly along said inclined section of trolley rail, said helical screw portion being of relatively uniform diameter along substantially the entire length of said screw conveyor shaft, the opposite end portions of said helical screw portion being laterally spaced to one side of said upper and lower levels of trolley rail respectively for operative engagement with the trolley assembly thereat to move such onto or off of said inclined section of trolley rail.

10. The structure set forth in claim 9 wherein said trolley assembly is engaged by said helical screw portion in a vertical plane disposed between said trolley rail and the rotational axis of said screw conveyor shaft.

11. The structure set forth in claim 10 wherein said trolley assembly includes a shackle member and a wheel rotatably mounted to said shackle member and engaging said trolley rail for movement thereon, said shackle member being operatively engaged by said helical screw portion.

* * * * *